United States Patent
Li et al.

(10) Patent No.: US 9,706,221 B2
(45) Date of Patent: Jul. 11, 2017

(54) MOTION SEARCH WITH SCALED AND UNSCALED PICTURES

(71) Applicants: Xinghai Li, North York (CA); Xin Guo, Toronto (CA)

(72) Inventors: Xinghai Li, North York (CA); Xin Guo, Toronto (CA)

(73) Assignee: VIXS SYSTEMS INC., Toronto (CA)

( * ) Notice: Subject to any disclaimer, the term of this patent is extended or adjusted under 35 U.S.C. 154(b) by 805 days.

(21) Appl. No.: 14/065,605

(22) Filed: Oct. 29, 2013

(65) Prior Publication Data

US 2015/0117535 A1    Apr. 30, 2015

(51) Int. Cl.
*H04N 19/124* (2014.01)
*H04N 19/523* (2014.01)
*H04N 19/567* (2014.01)
*H04N 19/59* (2014.01)

(52) U.S. Cl.
CPC ......... *H04N 19/523* (2014.11); *H04N 19/567* (2014.11); *H04N 19/59* (2014.11)

(58) Field of Classification Search
CPC .................................................. H04N 19/0009
USPC ...................................................... 375/240.16
See application file for complete search history.

(56) References Cited

U.S. PATENT DOCUMENTS

| | | | | |
|---|---|---|---|---|
| 2007/0286283 | A1* | 12/2007 | Yin | H04N 19/70 375/240.16 |
| 2008/0247462 | A1* | 10/2008 | Demos | H04N 19/597 375/240.03 |
| 2009/0207915 | A1* | 8/2009 | Yan | H04N 19/53 375/240.16 |
| 2010/0246682 | A1* | 9/2010 | Zhao | H04N 19/53 375/240.16 |

* cited by examiner

*Primary Examiner* — Christopher S Kelley
*Assistant Examiner* — Jonathan Messmore

(57) ABSTRACT

Reference pictures received via a video signal are downscaled to a specified resolution by a video encoder/decoder. For each current picture being processed by the video encoder/decoder, the current picture is maintained at its original received resolution, but is divided into blocks. Each block is further divided into sub-blocks, and each sub-block is compared, for a set of specified positions, to a corresponding block of the downscaled reference image to generate a set of candidate motion vectors. The candidate motion vectors are scored according to how closely their corresponding sub-block matches the corresponding block of the reference picture at the corresponding position, and a motion vector for each block of the current image is selected based on the scores. The selected motion vectors are used to process (e.g. encode) the video signal.

14 Claims, 4 Drawing Sheets

MOTION SEARCH WITH SCALED AND UNSCALED PICTURES

BACKGROUND

Field of the Disclosure

The present disclosure relates generally to encoding of video signals and more particularly to motion search for encoding of video signals.

Description of the Related Art

In many electronic devices, video information is encoded to reduce the size of the information and thus reducing the resources required to communicate or store the video information. The encoded video information is typically decoded before it is displayed. To ensure reliable communication of video information between different electronic devices, standards have been promulgated for many encoding methods including the H.264 standard that is also referred to as MPEG-4, part 10 or Advanced Video Coding, (AVC). The processing of video information, including the encoding thereof, frequently requires the generation of motion vectors based on comparisons between pictures embedded in the video information. Because the number of comparisons can put a severe strain on memory bandwidth and other device resources, the pictures are typically downscaled prior to generating the motion vectors. However, such downscaling can reduce the precision of the motion vector generation, thereby reducing the accuracy of the encoding or other video processing.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION OF EMBODIMENT(S)

FIGS. 1-4 disclose techniques for identifying motion vectors at a video encoder/decoder based on images received via a video signal. Selected pictures, referred to as reference pictures, are downscaled to a specified resolution. For each current picture being processed, the current picture is maintained at its original received resolution, but is divided into blocks. Each block is further divided into sub-blocks, and each sub-block is compared, for a set of specified search positions, to a corresponding block of the downscaled reference image to generate a set of candidate motion vectors. The candidate motion vectors are scored according to how closely their corresponding sub-block matches the corresponding block of the reference picture at the corresponding search position, and a motion vector for each block of the current image is selected based on the scores. The selected motion vectors are used to process (e.g. encode) the video signal. By using downscaled reference pictures and full-resolution current pictures to generate motion vectors, the video encoder/decoder reduces the amount of memory bandwidth and other resources consumed while enhancing the precision of the selected motion vectors.

Figure 1:
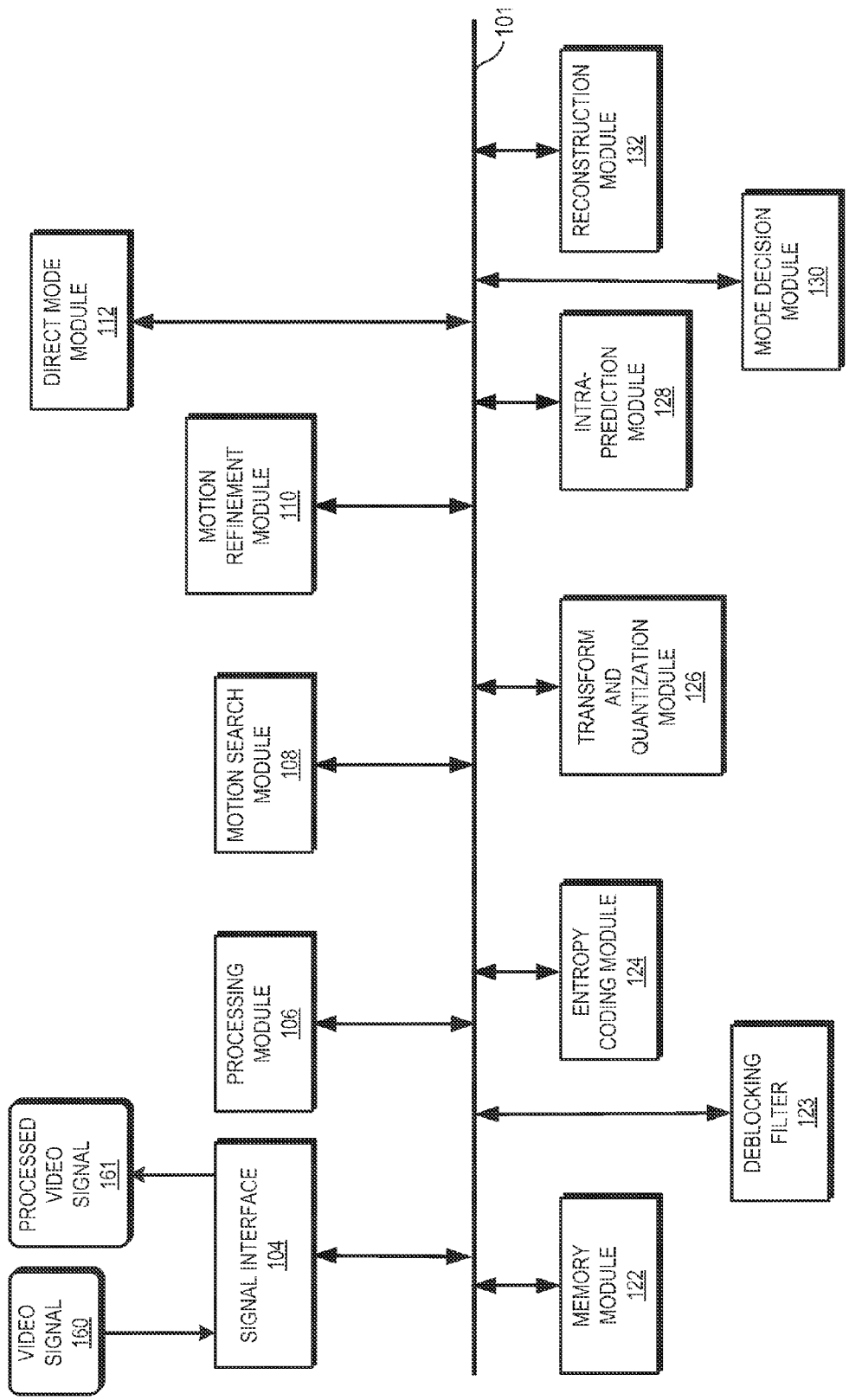
FIG. 1 is a block diagram of a video encoder/decoder in accordance with some embodiments.

FIG. 1 presents a block diagram representation of a video encoder/decoder 100 in accordance with an embodiment of the present invention. In particular, video encoder/decoder 100 can be a video codec that operates in accordance with many of the functions and features set forth in the H.264 standard, the MPEG-4 standard, VC-1 (SMPTE standard 421M) or other standard, to encode, decode or transcode a video input signal 160 to produce a processed video signal 161.

The video encoder/decoder 100 includes a signal interface 104 for receiving and conditioning the video signal 160 so that the signal is ready for processing. Accordingly, the signal interface 104 can include one or more amplifiers, filters, clock synchronization modules, and the like to ensure that the video signal 160 is in a specified condition so that it can be processed by other modules of the video encoder/decoder 100, as described below. In addition, the signal interface 104 is configured to receive the resulting processed video information, and condition the information to produce the processed video signal 161, so that the processed video signal 161 complies with a specified format for communication to another module or device.

The video encoder/decoder 102 includes a processing module 106 that can be implemented using a single processing device or a plurality of processing devices. Such a processing device may be a microprocessor, processor core, set of co-processors, a micro-controller, digital signal processor, microcomputer, central processing unit, field programmable gate array, programmable logic device, state machine, logic circuitry, analog circuitry, digital circuitry, or any combination thereof, and/or any device that manipulates signals (analog and/or digital) based on operational instructions that are stored in a memory, such as memory module 122.

Memory module 122 may be a single memory device or a plurality of memory devices. Such a memory device can include a hard disk drive or other disk drive, read-only memory, random access memory, volatile memory, non-volatile memory, static memory, dynamic memory, flash memory, cache memory, or any combination thereof, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 106 and memory module 122 are coupled, via bus 101, to the signal interface 104 and a plurality of other modules, such as motion search module 108, motion refinement module 110, direct mode module 112, intra-prediction module 128, mode decision module 130, reconstruction module 132, entropy coding/reorder module 124, forward transform and quantization module 126 and deblocking filter module 123. The modules of video encoder/decoder 102 can be implemented in software or firmware and be structured as operations performed by processing module 106. Alternatively, one or more of these modules can be implemented using a hardware engine that includes a state machine, analog circuitry, digital circuitry, and/or logic circuitry, and that operates either independently or under the control and/or direction of processing module 106 or one or more of the other modules, depending on the particular implementation. It should also be noted that the software implementations of the present invention can be stored on a tangible storage medium such as a magnetic or optical disk, read-only memory or random access memory and also be produced as an article of manufacture. While a particular bus architecture is shown, alternative architectures using direct connectivity between one or more modules and/or additional busses can likewise be implemented in accordance with the present invention.

Video encoder/decoder 100 can operate in various modes of operation that include an encoding mode and a decoding mode that is set by the value of a mode selection signal (not shown) that may be a user defined parameter, user input, register value, memory value or other signal. In addition, in video encoder/decoder 100, the particular standard used by the encoding or decoding mode to encode or decode the input signal can be determined by a standard selection signal that also may be a user defined parameter, user input, register value, memory value or other signal. In an embodiment of the present invention, the operation of the encoding mode utilizes a plurality of modules that each performs a specific encoding function. The operation of decoding also utilizes at least one of these plurality of modules to perform a similar function in decoding. In this fashion, modules such as the motion refinement module 110 and more particularly an interpolation filter used therein, and intra-prediction module 128 can be used in both the encoding and decoding process to save on architectural real estate when video encoder/decoder 100 is implemented on an integrated circuit or to achieve other efficiencies. In addition, some or all of the components of the direct mode module 112, mode decision module 130, reconstruction module 132, transformation and quantization module 126, deblocking filter module 123 or other function specific modules can be used in both the encoding and decoding process for similar purposes.

The motion search module 108 processes pictures from the video signal 160 based on a segmentation of each picture into blocks (e.g. macroblocks) of pixel values, such as of 16 pixels by 16 pixels size, from the columns and rows of a frame and/or field of the video signal 160. In at least one embodiment, the processing module 106 downscales reference pictures received via the video signal 160 to generate a downscaled reference picture, and stores the downscaled reference picture at the memory module 122. In some embodiments, the reference picture is first filtered by the deblocking filter 123 or other filter to perform band-limit filtering for the reference picture. The filtered reference picture is then downscaled and stored at the memory module 122. The stored downscaled reference picture is used for motion search for each non-reference picture. Because the reference picture that is used has been downscaled, the memory bandwidth used during motion search is reduced, relative to using a full-scale reference picture.

In some embodiments, the reference picture is an original (non-reconstructed) picture from the video signal 160 that is downscaled by filtering or decimating the pixels of the original picture. In some embodiments, the reference picture is a reconstructed picture. In such scenarios, the downscaled reference picture is generated and stored at the memory module 122 immediately after the reference picture is generated during the encoding process, before the reference picture has been restored to its full resolution.

The motion search module 108 performs motion search for each non-reference picture received via the video signal 160. In some embodiments, each non-reference picture is band-limit filtered, in similar fashion as the reference picture, prior to be used for motion search. The motion search module 108 maintains the filtered non-reference picture at its received resolution, but divides the picture into blocks. The motion search module 108 then subdivides each block into sub-blocks, and identifies one or more motion vectors that represent displacement of sub-blocks of the received picture from a corresponding block of the reference picture. In operation, the motion search module 108 operates within a search range to locate a sub-block in the current picture to an integer pixel level accuracy such as to a resolution of 1-pixel. Candidate locations are evaluated based on a cost formulation to determine the location and corresponding motion vector that have a most favorable (such as lowest) cost.

Thus, in some embodiments the motion search module 108 performs motion search using a stored downscaled reference picture and a non-reference picture that has been maintained at a higher resolution than the downscaled reference picture. This reduces the memory bandwidth used by the motion search process, relative to employing a full-resolution reference picture, while enhancing the resolution of the motion search process relative to employing a downscaled non-reference picture.

In some embodiments, a cost formulation for each motion vector is based on the Sum of Absolute Difference (SAD) between the reference macroblock and candidate macroblock pixel values and a weighted rate term that represents the number of bits required to be spent on coding the difference between the candidate motion vector and a predicted motion vector (PMV).

The motion refinement module 110 generates a refined motion vector for each macroblock of the plurality of macroblocks, based on the motion search motion vector. In an embodiment of the present invention, the motion refinement module determines, for each macroblock or macroblock pair of a field and/or frame of the video signal 160, a refined motion vector that represents the displacement of the macroblock from a reference frame or reference field of the video signal to a current frame or field.

Based on the pixels and interpolated pixels, the motion refinement module 110 refines the location of the macroblock in the current frame or field to a greater pixel level accuracy such as to a resolution of ¼-pixel or other sub-pixel resolution. Candidate locations are also evaluated based on a cost formulation to determine the location and refined motion vector that have a most favorable (such as lowest) cost. As in the case with the motion search module, a cost formulation can be based on the a sum of the Sum of Absolute Difference (SAD) between the reference macroblock and candidate macroblock pixel values and a weighted rate term that represents the number of bits required to be spent on coding the difference between the candidate motion vector and either a predicted motion vector (PMV). In this fashion, the motion refinement module 110 is able to operate on a macroblock to contemporaneously determine the motion search motion vector for each sub-block of the macroblock.

When estimated predicted motion vectors are used, the cost formulation avoids the use of motion vectors from the current row and both the motion search module 108 and the motion refinement module 110 can operate in parallel on an entire row of video signal 160, to contemporaneously determine the refined motion vector for each macroblock in the row.

The direct mode module 112 generates a direct mode motion vector for each macroblock, based on macroblocks that neighbor the macroblock. In an embodiment of the present invention, the direct mode module 112 operates to determine the direct mode motion vector and the cost associated with the direct mode motion vector based on the cost for candidate direct mode motion vectors for the B slices of video input signal 112, such as in a fashion defined by the H.264 standard.

While the prior modules have focused on inter-prediction of the motion vector, intra-prediction module 128 generates a best intra prediction mode for each macroblock of the plurality of macroblocks. In an embodiment of the present invention, intra-prediction module 210 operates as defined by the H.264 standard, however, other intra-prediction techniques can likewise be employed. In particular, intra-prediction module 128 operates to evaluate a plurality of intra prediction modes such as an Intra-4×4 or Intra-16×16, which are luma prediction modes, chroma prediction (8×8) or other intra coding, based on motion vectors determined from neighboring macroblocks to determine the best intra prediction mode and the associated cost.

The mode decision module 130 determines a final macroblock cost for each macroblock of the plurality of macroblocks based on costs associated with the refined motion vector, the direct mode motion vector, and the best intra prediction mode, and in particular, the method that yields the most favorable (e.g., lowest) cost, or an otherwise acceptable cost. The reconstruction module 132 completes the motion compensation by generating residual luma and/or chroma pixel values for each macroblock of the plurality of macroblocks.

The forward transform and quantization module 126 generates the processed video signal 161 by coding and quantizing the residual pixel values into quantized transformed coefficients that can be further coded, such as by entropy coding in entropy coding module 124 and filtered by de-blocking filter module 222. In at least one embodiment, further formatting and/or buffering can optionally be performed by signal interface 104.

While not expressly shown, video encoder/decoder 102 can include a memory cache, shared memory, a memory management module, a comb filter or other video filter, and/or other module to support the encoding of video input signal 110 into processed video signal 112.

Figure 2:
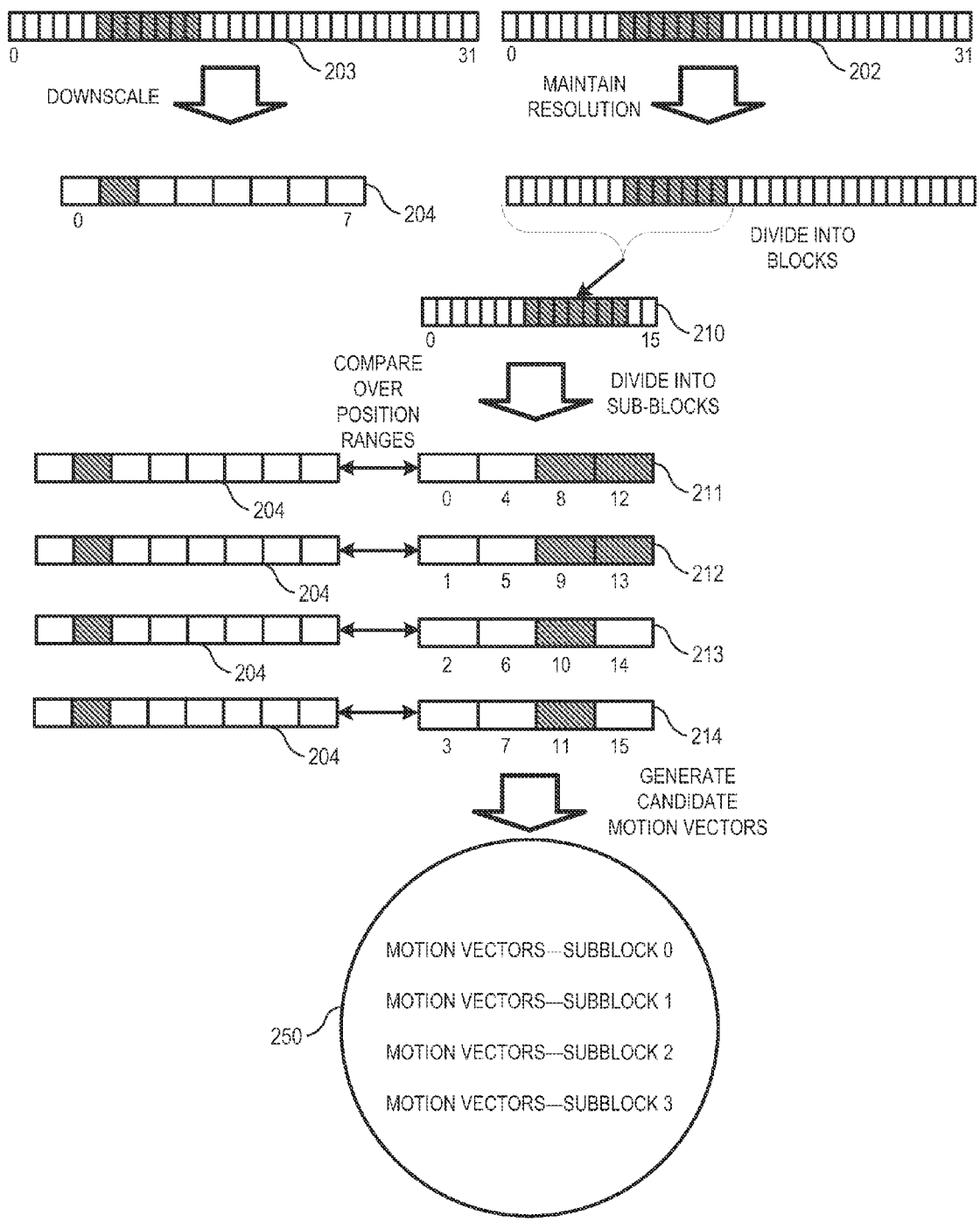
FIG. 2 is a block diagram illustrating an example motion search for one-dimensional pictures in accordance with some embodiments.

FIG. 2 illustrates a block diagram depicting an example of the motion search module 108 identifying a set of candidate motion vectors for scoring. In particular, the example of FIG. 2 shows the comparison of a current picture 202 to a reference picture 203 to identify a set 250 of candidate motion vectors. In the illustrated example, the reference picture 203 and the current picture 202 are each received, via the video stream 160, as one-dimensional images each composed of 32 pixels, numbered 0 through 31. Further, in the illustrated example, the pixels can take on one of two values, a "0" value, denoted by a clear rectangle, and a "1" value, denoted by a cross-hatched rectangle. Thus, pixels 6-12 of reference picture 203 have a value of 1 and the remaining pixels of reference picture 203 have a value of zero. Pixels 8-13 of current picture 202 have a value of 1 and the remaining pixels of current picture 202 have a value of zero.

It will be appreciated that in some embodiments, the illustrated reference picture 203 and current picture 202 are first filtered by a band-limited filter before they are downscaled (in the case of the reference picture 203) or separated into sub-blocks (in the case of the current picture 202). In these embodiments, the resulting downscaled pictures and sub-blocks will have pixel values that can have values other than 0 or 1. For simplicity of illustration, FIG. 2 does not show this band-limit filtering for the reference picture 203 and the current picture 202.

To reduce the amount of resources consumed to transfer the reference picture 203 to and from the memory module 122 and the motion search module 108, the processing module 106 downscales the reference picture 203 to generate a downscaled reference picture 204, and stores the downscaled reference picture 204 to the memory module 122. In the illustrated example, the processing module 106 generates the downscaled reference picture 204 by downscaling the reference picture 203 by a factor of four, such that the downscaled reference picture is composed of 8 pixels. In at least one embodiment, the processing module 106 generates the downscaled reference picture 204 by averaging the values of every R pixels of the reference picture 203 to generate a corresponding one of the pixels of the downscaled reference picture 204, where R is an integer representing the downscaling factor.

When the current picture 202 is received, it is not downscaled, but instead is maintained at its original 32 pixel resolution. This allows the motion search module 108 to generate motion vectors having a greater precision than if the current picture 202 were downscaled to match the resolution of the downscaled reference picture 204. To generate the motion vectors, the motion search module 108 separates the current picture 202 into N blocks, where N is an integer. In the illustrated example, N is equal to 2, such that each block has a resolution of 16 pixels. The motion search module 108 separates each block into M sub-blocks, where M is an integer. In some embodiments, M is equal to the downscaling factor R. In the illustrated example, M is equal to 4. The M sub-blocks are formed by selecting the first M pixels initial pixels for the sub-blocks, and selecting every Mth pixel after the initial pixel for each corresponding sub-block. Thus, four sub-blocks are formed as follows: for the first sub-block, a value P is set to the first pixel of the block, and the pixels of the sub-block correspond to pixels P, P+M, P+2*M, and P+3*M of the block. The pixels of the second sub-block correspond to pixels P+1, (P+1)+M, (P+1)+2*M, and (P+1)+3*M. The pixels of the third sub-block correspond to pixels P+2, (P+2)+M, (P+2)+2*M, and (P+2)+3*M. The pixels of the fourth sub-block correspond to pixels P+3, (P+3)+M, (P+3)+2*M, and (P+3)+3*M.

To illustrate further, in the example of FIG. 2 the current picture 202 is divided into two blocks, including a block 210. The block 210 is separated into four sub-blocks designated sub-block 211, sub-block 212, sub-block 213, and sub-block 214, respectively. Sub-block 211 is composed of pixels 0, 4, 8, and 12 of block 210; sub-block 212 is composed of pixels 1, 5, 9, and 13; sub-block 213 is composed of pixels 2, 6, 10, and 14; and sub-block 214 is composed of pixels 3, 7, 11, and 15 of block 210.

The motion search module 108 identifies the set 250 of candidate motion vectors by identifying the displacement of each sub-block from a corresponding sub-block of the downscaled reference picture 204. In operation, the motion search module 108 operates within a search range to locate a sub-block of the current picture 202 to an integer pixel level accuracy such as to a resolution of Q pixels, where Q is an integer. With one search position (with Q-pixel resolution) on reference pictures, each sub-block will give a Q-pixel resolution motion vector for that position but there is a different Q-pixel offset for each sub block. For example, for search position mx on the reference picture 203, M sub blocks, the motion search module 108 will generate the set 250 of motion vectors to include vectors (mx*N), (mx*N−

1), (mx*N−2), . . . , (mx*N−3), and so on until all candidate motion vectors for a block have been generated. In some embodiments, Q and N are equal to M.

The motion search module 108 assigns a cost to each of the candidate motion vectors in the set 250 based on a cost formulation to identify the location and corresponding motion vector that have a most favorable (such as lowest) cost. In some embodiments, as described further herein, a cost formulation for each motion vector is based on the Sum of Absolute Differences (SAD) between the reference macroblock and candidate sub-block pixel values. The motion search module 108 selects the motion vectors, for each block, having the most favorable cost, and the video encoder/decoder 108 employs the selected motion vectors to process (e.g. encode or decode) the video signal 160.

Figure 3:
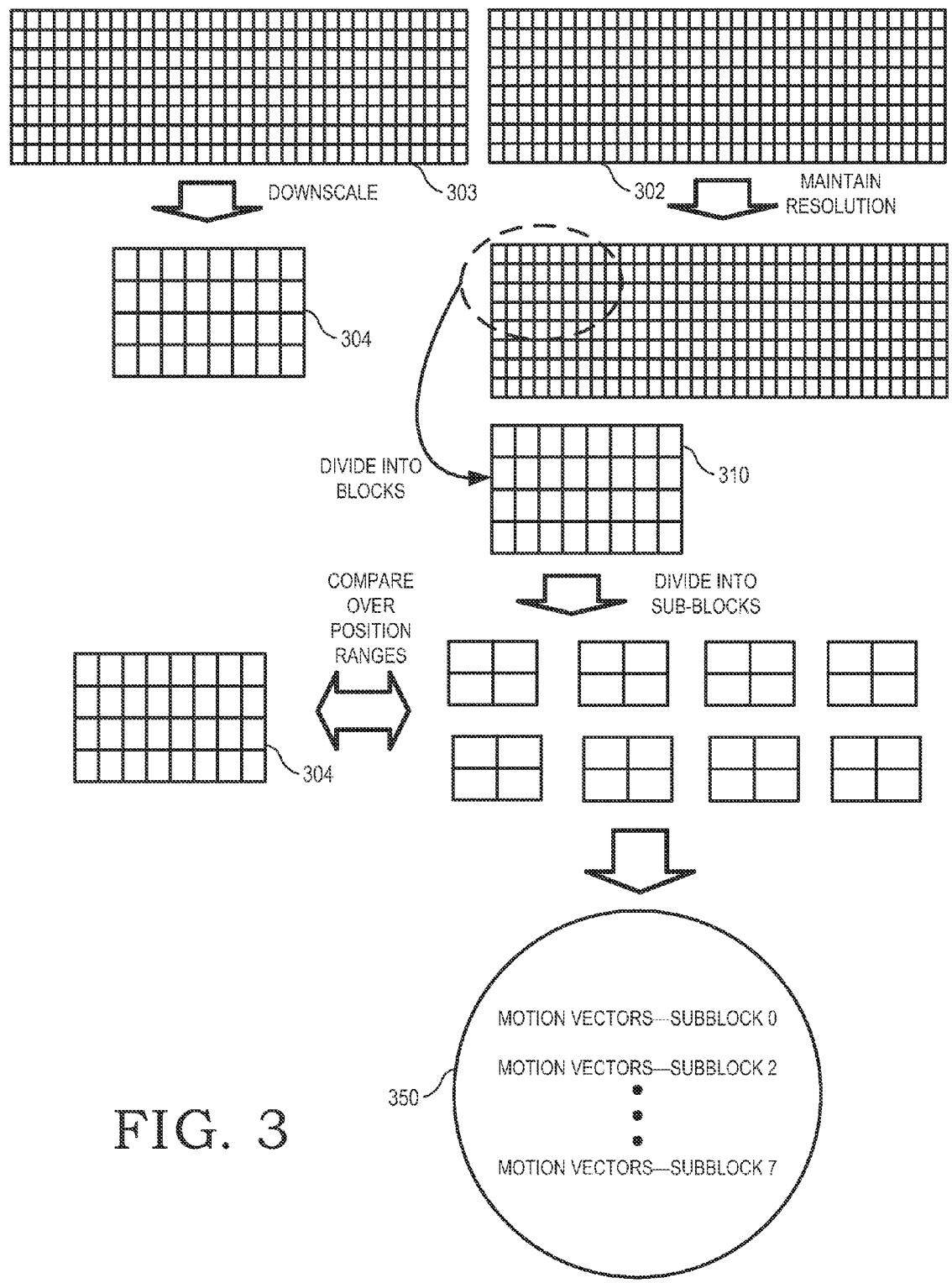
FIG. 3 is a block diagram illustrating an example motion search for two-dimensional pictures in accordance with some embodiments.

FIG. 3 illustrates a block diagram depicting an example of the motion search module 108 identifying a set of candidate motion vectors for scoring for pictures having two dimensions of pixels. In the example of FIG. 3, a current picture 302 is compared to a reference picture 303 to identify a set 350 of candidate motion vectors. The reference picture 303 and the current picture 302 are each received, via the video stream 160, as two-dimensional images each composed of 32×8 pixels.

To reduce the amount of resources consumed to transfer the reference picture 303 to and from the memory module 122 and the motion search module 108, the processing module 106 downscales the reference picture 303 to generate a downscaled reference picture 304, and stores the downscaled reference picture 304 to the memory module 122. In the illustrated example, the processing module 106 generates the downscaled reference picture 304 by downscaling the reference picture 303 by a factor of four in the x-direction and by a factor of 2 in the y direction, such that the downscaled reference picture is composed of 8×4 pixels. In at least one embodiment, processing module 106 generates the downscaled reference picture 304 by averaging the values of every R pixels of the reference picture 303 in the x-direction, and then averaging every S pixels in the y-direction, to generate a corresponding one of the pixels of the downscaled reference picture 204, where R and S are integers representing the downscaling factors. Thus, in the illustrated example of FIG. 3, R is equal to 4 and S is equal to 2.

When the current picture 303 is received, it is not downscaled, but instead is maintained at its original 32×8 pixel resolution. To generate candidate motion vectors, the motion search module 108 separates the current picture 302 into N blocks, where N is an integer. In the illustrated example, N is equal to 8, such that each block has a resolution of 8×4 pixels. The motion search module 108 separates each block into sub-blocks The sub-blocks are formed in similar fashion described above with respect to FIG. 2 in both the x-direction and y-direction. The resulting sub-blocks are reduced by R pixels in the x-direction and S pixels in the Y direction, thus generating 8 2×2 sub-blocks.

The motion search module 108 identifies the set 350 of candidate motion vectors by identifying the displacement of each sub-block from a corresponding sub-block of the downscaled reference picture 304. In operation, the motion search module 108 operates within a search range to locate a sub-block of the current picture 302 to an integer pixel level accuracy such as to a resolution of Q×Q pixels, where Q is an integer. With one search position (with Q×Q-pixel resolution) on reference pictures, each sub-block will give a Q×Q-pixel resolution motion vector for that position, but there is a different full-pixel offset for each sub-block. For example, for search position (mx,my) on the reference picture 303, N*N sub blocks will give motion vectors (mx*N,mx*N), (mx*N−1,my*N), (mx*N−2,my*N), . . . , (mx*N−3, my*N−3), for a total of 16 candidate motion vectors covering the search position at full-pixel resolution.

The motion search module 108 assigns a cost to each of the candidate motion vectors in the set 350 based on a cost formulation to identify the location and corresponding motion vector that have a most favorable (such as lowest) cost. In some embodiments, as described further herein, a cost formulation for each motion vector is based on the Sum of Absolute Difference (SAD) between the reference macroblock and candidate sub-block pixel values. The motion search module 108 selects the motion vectors, for each block, having the most favorable cost, and the video encoder/decoder 108 employs the selected motion vectors to process (e.g. encode or decode) the video signal 160.

Figure 4:
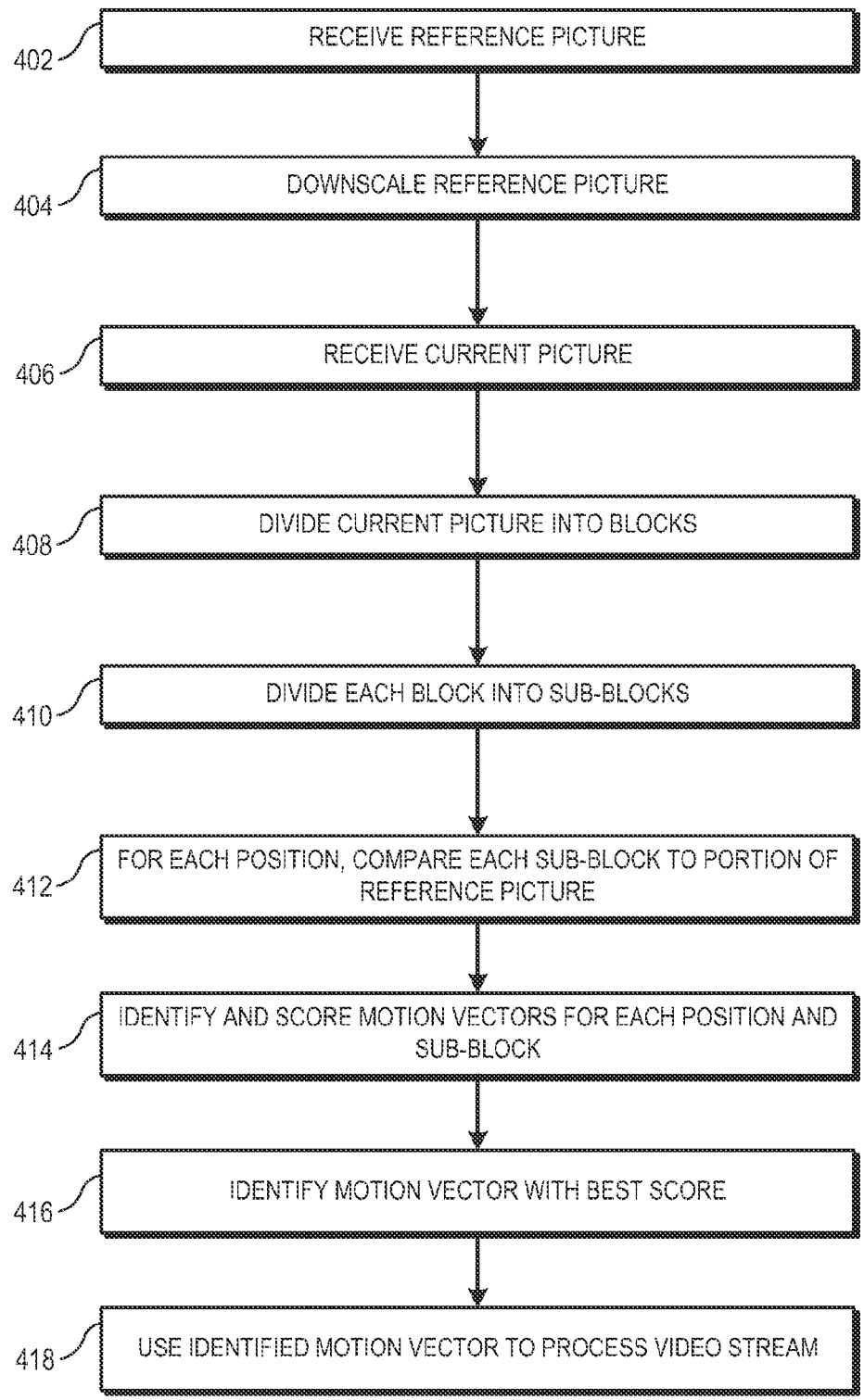
FIG. 4 is a flow diagram of a method of performing motion search for processing video in accordance with some embodiments.

FIG. 4 illustrates a flow diagram of a method 400 of performing motion search for processing video in accordance with some embodiments. For purposes of description, the method 400 is described with respect to an example implementation at the video encoder/decoder 100 of FIG. 1. At block 402, the video encoder/decoder 100 receives a reference picture via the video signal 160. At block 404 the processing module 106 downscales the reference picture by a specified factor and stores the downscaled reference picture at the memory module 122. At block 406 the video encoder/decoder 100 receives a current picture via the video signal 160. The video encoder/decoder 100 maintains the current picture at its full resolution for motion search.

At block 408, the motion search module 108 divides the current picture into a specified number of blocks (e.g. macroblocks). At block 410, the motion search module 108 divides each block into a corresponding set of sub-blocks as described above with respect to FIGS. 2 and 3. At block 412, the motion search module 108 compares, for each of a specified range of positions, each sub-block to a corresponding portion (e.g. macroblock) of the downscaled reference image. Based on the comparisons, at block 414 the motion search module 108 identifies a set of candidate motion vectors for each sub-block, and generates a score for each candidate motion vector reflecting how closely the corresponding portion of the downscaled reference image matches the pixels of the corresponding sub-block at the position indicated by the candidate motion vector. At block 416, the motion search module 108 identifies, for each block of the current picture, the candidate motion search vector having the best (e.g. lowest) score. At block 418, the motion search module uses the identified motion vectors to process (e.g. encode) the video signal 160 to generate the processed video signal 161.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method implemented at a video encoder/decoder, comprising:
    comparing a first picture having a first resolution to a second picture having a second resolution, the first resolution being different than the second resolution;
    identifying a first motion vector for a video signal based on the comparison of the first picture and the second picture;
    processing the video signal based on the first motion vector to generate a processed video signal, and
    wherein identifying the first motion vector comprises:
        dividing the second picture into N blocks;
        dividing each of the N blocks of the second picture into M sub-blocks, wherein dividing each of the N blocks comprises dividing a first of the N blocks into a first sub-block by selecting a first initial pixel of the first of the N blocks and selecting the first initial pixel and every M-th pixel after the first initial pixel for the first sub-block;
        generating a plurality of motion vectors for each of a plurality of search positions by comparing, for each of the plurality of search positions, each of the M sub-blocks to a corresponding portion of the first picture; and
        selecting the first motion vector from the plurality of motion vectors.

2. The method of claim 1, further comprising:
    downscaling the first picture from the second resolution to the first resolution prior to identifying the first motion vector.

3. The method of claim 1, wherein selecting the first motion vector comprises:
    assigning a score to each of the plurality of motion vectors based on how closely the corresponding portion of the first picture matches the corresponding one of the M sub-blocks; and
    selecting the first motion vector based on the scores assigned to the plurality of motion vectors.

4. The method of claim 3, wherein assigning the score comprises assigning the score based upon a sum of absolute differences between the M sub-blocks and the corresponding portions of the first picture.

5. The method of claim 1, wherein dividing each of the N blocks further comprises:
    dividing a second of the N blocks into a second sub-block by selecting a second initial pixel of the first of the N blocks and selecting the second initial pixel and every M-th pixel after the second initial pixel for the second sub-block.

6. The method of claim 1, wherein processing the video signal comprises encoding the video signal.

7. A method, comprising:
    downscaling a reference picture of a video signal to generate a downscaled reference picture;
    comparing the downscaled reference picture to a current picture of the video signal, the current picture having a different resolution than the downscaled reference picture;
    identifying a plurality of motion vectors for the current picture based on the comparison;
    processing the video signal based on the plurality of motion vectors, and
    wherein identifying the plurality of motion vectors comprises:
        dividing the current picture into N blocks;
        dividing each of the N blocks of the current picture into M sub-blocks, wherein dividing each of the N blocks comprises dividing a first of the N blocks into a first sub-block by selecting a first initial pixel of the first of the N blocks and selecting the first initial pixel and every M-th pixel after the first initial pixel for the first sub-block;
        generating a plurality of candidate motion vectors for each of a plurality of search positions by comparing, for each of the plurality of search positions, each of the M sub-blocks to a corresponding portion of the downscaled reference picture; and
        selecting the plurality of motion vectors the plurality of candidate motion vectors.

8. The method of claim 7, wherein the resolution of the current picture matches a resolution of the reference picture.

9. The method of claim 7, wherein selecting the plurality of candidate motion vectors comprises:
    assigning a score to each of the plurality of candidate motion vectors based on how closely the corresponding portion of the downscaled reference picture matches the corresponding one of the M sub-blocks; and
    selecting the plurality of motion vectors based on the scores assigned to the plurality of candidate motion vectors.

10. The method of claim 7, wherein dividing each of the N blocks further comprises:
    dividing a second of the N blocks into a second sub-block by selecting a second initial pixel of the first of the N blocks and selecting the second initial pixel and every M-th pixel after the second initial pixel for the second sub-block.

11. A video encoder/decoder, comprising:
a motion search module to compare a first picture having a first resolution to a second picture having a second resolution, the first resolution being different than the second resolution and identify a first motion vector for a video signal based on the comparison of the first picture to the second picture, wherein the motion search module is to identify the first motion vector by:
dividing the second picture into N blocks;
dividing each of the N blocks of the second picture into M sub-blocks by dividing a first of the N blocks into a first sub-block by selecting a first initial pixel of the first of the N blocks and selecting the first initial pixel and every M-th pixel after the first initial pixel for the first sub-block;
generating a plurality of motion vectors for each of a plurality of search positions by comparing, for each of the plurality of search positions, each of the M sub-blocks to a corresponding portion of the first picture; and
selecting the first motion vector from the plurality of motion vectors; and
a processing module to process the video signal based on the first motion vector to generate a processed video signal.

12. The video encoder/decoder of claim 11, wherein the processing module is to:
downscale the first picture from the second resolution to the first resolution prior to identifying the first motion vector.

13. The video encoder/decoder of claim 11, wherein the motion search module is to select the first motion vector by:
assigning a score to each of the plurality of motion vectors based on how closely the corresponding portion of the first picture matches the corresponding one of the M sub-blocks; and
selecting the first motion vector based on the scores assigned to the plurality of motion vectors.

14. The video encoder/decoder of claim 11, wherein the motion search module is to divide each of the N blocks further by:
dividing a second of the N blocks into a second sub-block by selecting a second initial pixel of the first of the N blocks and selecting the second initial pixel and every M-th pixel after the second initial pixel for the second sub-block.

* * * * *